US012584848B2

(12) United States Patent
Hatakeyama et al.

(10) Patent No.: US 12,584,848 B2
(45) Date of Patent: Mar. 24, 2026

(54) DETECTION OPTICAL SYSTEM, DETECTION DEVICE, FLOW CYTOMETER, AND IMAGING CYTOMETER

(71) Applicant: SONY GROUP CORPORATION, Tokyo (JP)

(72) Inventors: Takeshi Hatakeyama, Kanagawa (JP); Shingo Imanishi, Tokyo (JP); Yoshiki Okamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 178 days.

(21) Appl. No.: 17/755,400

(22) PCT Filed: Oct. 20, 2020

(86) PCT No.: PCT/JP2020/039398
§ 371 (c)(1),
(2) Date: Apr. 28, 2022

(87) PCT Pub. No.: WO2021/090675
PCT Pub. Date: May 14, 2021

(65) Prior Publication Data
US 2022/0404263 A1 Dec. 22, 2022

(30) Foreign Application Priority Data
Nov. 7, 2019 (JP) ................................. 2019-202585

(51) Int. Cl.
*G01N 15/1434* (2024.01)
*G02B 13/18* (2006.01)
*G02B 21/00* (2006.01)

(52) U.S. Cl.
CPC ..... *G01N 15/1436* (2013.01); *G01N 15/1434* (2013.01); *G02B 13/18* (2013.01); *G02B 21/0004* (2013.01); *G01N 2015/1443* (2013.01)

(58) Field of Classification Search
CPC ........... G01N 15/1436; G01N 15/1434; G01N 2015/1443; G01N 15/1459; G02B 13/18; (Continued)

(56) References Cited

U.S. PATENT DOCUMENTS

| | | | |
|---|---|---|---|
| 5,680,200 A | 10/1997 | Sugaya et al. | |
| 6,473,228 B1 | 10/2002 | Toshimitsu | |
| 2004/0170106 A1* | 9/2004 | Komma | ............. G11B 7/13922 |

(Continued)

FOREIGN PATENT DOCUMENTS

| | | |
|---|---|---|
| CN | 104641217 A | 5/2015 |
| EP | 1195635 A1 | 4/2002 |

(Continued)

OTHER PUBLICATIONS

JP 09127409 Description, Machine translation of the description of foreign patent JP 09127409 A (Year: 1997).*

(Continued)

*Primary Examiner* — Pinping Sun
(74) *Attorney, Agent, or Firm* — CHIP LAW GROUP

(57) ABSTRACT
A detection optical system includes an objective lens, a first relay lens, a second relay lens, and an imaging lens, which are arranged in order from a side of a specimen along an optical path of light from the specimen illuminated by a light source. A primary imaging plane is provided on the optical path between the first relay lens and the second relay lens. An aspherical correction plate that corrects spherical aberration is arranged at a position located between the second relay lens and the imaging lens and substantially conjugate with a pupil position of the objective lens.

14 Claims, 4 Drawing Sheets

(58) Field of Classification Search
CPC ............ G02B 21/0004; G02B 13/0095; G02B 21/361; G02B 21/33; G02B 21/086; G02B 21/18
See application file for complete search history.

(56) References Cited

U.S. PATENT DOCUMENTS

| | | | | |
|---|---|---|---|---|
| 2010/0220315 A1* | 9/2010 | Morrell | ............. | G01N 15/1436 356/73 |
| 2012/0229892 A1* | 9/2012 | Kang | ....................... | G02B 9/10 359/356 |
| 2015/0115174 A1 | 4/2015 | Chen | | |
| 2017/0059840 A1* | 3/2017 | Tamano | ............. | G02B 21/0024 |
| 2017/0307509 A1* | 10/2017 | Boccara | ................ | G06T 7/0012 |
| 2018/0284008 A1* | 10/2018 | Kinishi | ........... | G01N 35/00871 |
| 2018/0356284 A1* | 12/2018 | Takei | ................... | G01J 3/2823 |
| 2019/0301993 A1* | 10/2019 | Matsumoto | ........ | G01N 15/1459 |
| 2019/0329351 A1* | 10/2019 | Goya | .................... | B23K 26/38 |
| 2020/0041774 A1* | 2/2020 | Zhang | ............... | G01N 21/8806 |

FOREIGN PATENT DOCUMENTS

| | | | | | |
|---|---|---|---|---|---|
| JP | 09127409 A | * | 5/1997 | | |
| JP | 2001-083428 A | | 3/2001 | | |
| JP | 4711009 B2 | | 6/2011 | | |
| JP | 2017-062247 A | | 3/2017 | | |
| JP | 2017-102013 A | | 6/2017 | | |
| KR | 10-1996-0029824 A | | 8/1996 | | |
| TW | 201405116 A | | 2/2014 | | |
| WO | 2001/081971 A1 | | 11/2001 | | |
| WO | 2013/181453 A2 | | 12/2013 | | |
| WO | WO-2015053393 A1 | * | 4/2015 | ........ | G01N 15/0227 |

OTHER PUBLICATIONS

International Search Report and Written Opinion of PCT Application No. PCT/JP2020/039398, issued on Dec. 28, 2020, 09 pages of ISRWO.

* cited by examiner

DETECTION OPTICAL SYSTEM, DETECTION DEVICE, FLOW CYTOMETER, AND IMAGING CYTOMETER

CROSS REFERENCE TO RELATED APPLICATIONS

This application is a U.S. National Phase of International Patent Application No. PCT/JP2020/039398 filed on Oct. 20, 2020, which claims priority benefit of Japanese Patent Application No. JP 2019-202585 filed in the Japan Patent Office on Nov. 7, 2019. Each of the above-referenced applications is hereby incorporated herein by reference in its entirety.

FIELD

The present disclosure relates to a detection optical system, a detection device, a flow cytometer, and an imaging cytometer.

BACKGROUND

As a detection optical system for detecting light from a specimen, for example, an inspection device such as an optical microscope, a flow cytometer, or an imaging cytometer is known. The inspection device such as a flow cytometer or an imaging cytometer includes a detection optical system for detecting light from a specimen. In this type of flow cytometer and imaging cytometer, a flow path chip having a flow path through which particles flow together with liquid, what is called a flow cell, is irradiated with light, and scattered light and fluorescence from particles as a specimen are detected.

CITATION LIST

Patent Literature

Patent Literature 1: JP 4711009 B2

SUMMARY

Technical Problem

In order to increase sensitivity of detecting scattered light and fluorescence from the specimen, it is conceivable to increase the numerical aperture NA of the objective lens as much as possible. However, in a case of manufacturing a desired objective lens, the manufacturing cost of the detection optical system increases. For example, in a case where an objective lens used in an optical microscope is used as the objective lens having a large numerical aperture NA, detection accuracy and detection efficiency decrease due to influence of spherical aberration generated in the optical path between the specimen and the objective lens.

Therefore, the present disclosure proposes a detection optical system, a detection device, a flow cytometer, and an imaging cytometer capable of correcting the spherical aberration generated in an optical path from a specimen to an objective lens.

Solution to Problem

According to the present disclosure, detection optical system, includes: an objective lens, a first relay lens, a second relay lens, and an imaging lens, which are arranged in order from a side of a specimen along an optical path of light from the specimen illuminated by a light source, wherein a primary imaging plane is provided on the optical path between the first relay lens and the second relay lens, and an aspherical correction plate that corrects spherical aberration is arranged at a position located between the second relay lens and the imaging lens and substantially conjugate with a pupil position of the objective lens.

DESCRIPTION OF EMBODIMENTS

Hereinafter, embodiments of the present disclosure will be described in detail with reference to the drawings. Note that the detection optical system, the detection device, the flow cytometer, and the imaging cytometer of the present disclosure are not limited by the following examples.

First Embodiment

Figure 1:
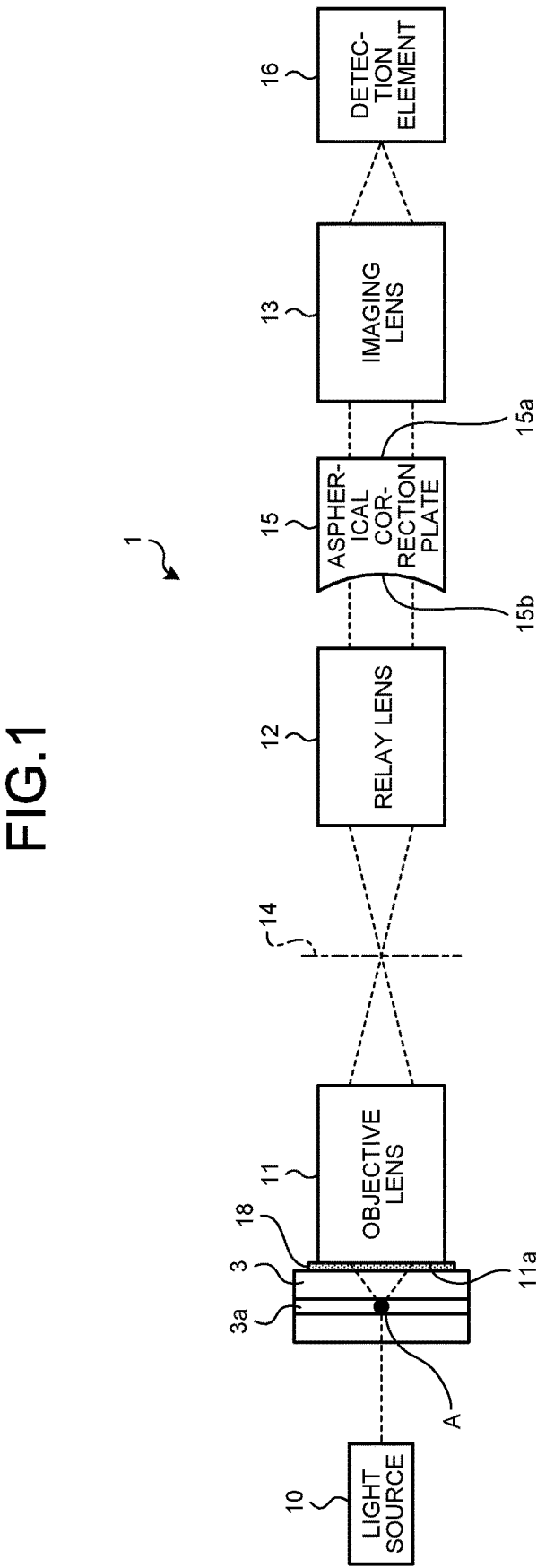
FIG. 1 is a schematic diagram illustrating a detection optical system of a first embodiment.

FIG. 1 is a schematic diagram illustrating a detection optical system of a first embodiment. The detection optical system of the first embodiment is a detection optical system for detecting light of a specimen, and is used in, for example, a particle inspection device such as a flow cytometer or an imaging cytometer. As illustrated in FIG. 1, the detection optical system 1 of the first embodiment is a detection optical system that detects scattering and fluorescence from a specimen A using particles flowing through a flow path 3a included in a flow path chip (flow cell) 3 as the specimen A.

Note that the detection optical system of the present disclosure is not limited to those used in a particle inspection device such as a flow cytometer or an imaging cytometer, and may be applied to, for example, detection optical systems in general for detecting scattered light or fluorescence from the specimen A, or may be applied to an optical microscope.

(Configuration of Detection Optical System)

As illustrated in FIG. 1, the detection optical system 1 of the first embodiment includes an objective lens 11, a relay lens 12, and an imaging lens 13, which are arranged in order from the specimen A side along an optical path of light from the specimen A illuminated by a light source 10, and light from the imaging lens 13 is detected by a detection element 16.

A primary imaging plane 14 is provided on an optical path between the objective lens 11 and the relay lens 12. An aspherical correction plate 15 that corrects spherical aberration is arranged at a position located between the relay lens 12 and the imaging lens 13 and substantially conjugate with a pupil position of the objective lens 11. The aspherical correction plate 15 corrects the spherical aberration generated in the optical path from the specimen A to the objective lens 11.

Note that the optical path from the specimen A to the objective lens 11 refers to an optical path between the specimen A and an incident surface 11a of the objective lens 11 on which the light from the specimen A is incident. In addition, it is desirable that the aspherical correction plate 15 is arranged at a position conjugate with the pupil position of the objective lens 11 on the relay lens 12 side, but even in a case where the aspherical correction plate 15 is arranged by slightly shifting with respect to the conjugate position, an action of appropriately correcting the spherical aberration can be obtained.

As the objective lens 11 in the first embodiment, for example, a commercially available objective lens is used. As the objective lens 11, in a case where the detection optical system 1 is used to detect scattered light and fluorescence from the specimen A, it is desirable to increase the numerical aperture NA in order to increase detection sensitivity, and thus an objective lens having a numerical aperture NA of one or more is particularly preferable among commercially available objective lenses.

As the relay lens 12, a collimator lens is used, and light incident from the objective lens 11 through the primary imaging plane 14 is made to be parallel light. The relay lens 12 in the first embodiment refers to a lens arranged next to the objective lens 11 from the specimen A side toward the detection element 16 side. The imaging lens 13 is a condenser lens, and condenses light incident from the aspherical correction plate 15 on, for example, a light receiving region of the detection element 16 such as a photodetector. In the first embodiment, light emitted from the imaging lens 13 is directly condensed on the detection element 16, but it may be configured to condense the light on the light receiving region of the detection element 16 through a light guide member such as an optical fiber or a light guide plate, for example.

Note that, in the detection optical system 1, a plurality of relay lenses constituting an optical path may be arranged on the optical path between the relay lens 12 and the aspherical correction plate 15 and the optical path between the aspherical correction plate 15 and the imaging lens 13 as necessary. Further, the objective lens 11 and the imaging lens 13 may be formed by combining a plurality of lenses.

(Aspherical Correction Plate)

The aspherical correction plate 15 is formed in a shape in which refractive power at a center portion located on the optical axis of the optical path of the detection optical system 1 is substantially no power, and negative refractive power gradually increases as the distance from the optical axis increases from the center portion toward an outer peripheral portion. In other words, the center portion of the aspherical correction plate 15 has almost no refractive power, and thus the incident light is transmitted without being refracted. The aspherical correction plate 15 is formed such that the negative refractive power gradually increases from the center portion toward the outer periphery.

In the aspherical correction plate 15, a flat surface 15a is formed on one surface in an optical axis direction of the optical path of the detection optical system 1, and an aspherical surface 15b is formed on the other surface. The aspherical correction plate 15 is formed as, for example, a concave lens having a concave aspherical surface 15b. Thus, it is possible to easily process the aspherical correction plate 15 having a characteristic that the negative refractive power gradually increases from the center portion toward the outer peripheral portion.

Note that, as an example, the aspherical correction plate 15 in the first embodiment is arranged such that the aspherical surface 15b side faces the relay lens 12 side and the flat surface 15a side faces the imaging lens 13 side, but the orientation of the aspherical surface 15b is not limited. The aspherical correction plate 15 may be arranged such that the flat surface 15a side faces the relay lens 12 side and the aspherical surface 15b side faces the imaging lens 13 side.

In the detection optical system 1 of the first embodiment, when a wavefront aberration amount generated in an optical path between the specimen A and the incident surface 11a of the objective lens 11 (hereinafter, it is also referred to as an optical path from the specimen A to the objective lens 11) on which light from the specimen A is incident is denoted by SA, and a focal length of the objective lens 11 is denoted by Fo, $$5 \times 10^{-6} < (SA/Fo) < 1 \times 10^{-6} \qquad \text{Expression 1}$$

is satisfied.

In other words, the detection optical system 1 is an optical system in which a large spherical aberration amount (for convenience, Expression 1 is defined by the wavefront aberration amount) satisfying the expression 1 is generated in the optical path from the specimen A to the objective lens 11, and the large spherical aberration amount satisfying the expression 1 can be corrected by the aspherical correction plate 15. Further, the lower limit value in Expression 1 indicates the amount of wavefront aberration generated by the optical microscope. The upper limit value in Expression 1 indicates the maximum value of the wavefront aberration amount generated between particles in the flow path chip 3 and the objective lens 11 as in the particle inspection device such as a flow cytometer or an imaging cytometer. That is, the aspherical correction plate 15 is formed to appropriately correct the spherical aberration that is larger than the spherical aberration amount (wavefront aberration amount) in the optical microscope and is about the maximum spherical aberration amount generated in the particle inspection device.

Further, the objective lens 11 in the first embodiment is what is called a liquid immersion objective lens, and immersion oil 18 is filled between the flow path chip 3 through which the particles as the specimen A flow and the objective lens 11, so that the numerical aperture NA of the objective lens 11 is increased.

(Behavior of Light)

In the detection optical system 1, light from the specimen A is incident on the objective lens 11, and light emitted from the objective lens 11 forms an image on the primary imaging plane 14 located between the objective lens 11 and the relay lens 12, and is incident on the relay lens 12. The light incident on the relay lens 12 is incident on the aspherical correction plate 15, and the light in which the spherical aberration is corrected is incident on the imaging lens 13. The light incident on the imaging lens 13 is condensed on the light receiving region of the detection element 16, and the light from the specimen A is detected by the detection element 16.

In particular, in a case of detecting light from particles in the flow path chip 3, the spherical aberration generated between the particles and the objective lens 11 tends to increase due to the optical influence of the material forming the flow path chip 3. Such large spherical aberration can be effectively corrected by the aspherical correction plate 15. Note that examples of the material for forming the flow path chip 3 include polycarbonate, cycloolefin polymer, polypropylene, polydimethylsiloxane (PDMS), glass, quartz, silicon, and the like.

(Effects)

As described above, the detection optical system 1 of the first embodiment includes the objective lens 11, the relay lens 12, and the imaging lens 13, the primary imaging plane 14 is provided on the optical path between the objective lens 11 and the relay lens 12, and the aspherical correction plate 15 is arranged at a position substantially conjugate with the pupil position of the objective lens 11 between the relay lens 12 and the imaging lens 13. Thus, the aspherical correction plate 15 can correct the spherical aberration generated in the optical path from the specimen A to the objective lens 11. In particular, this is effective in a case where it is difficult to secure a space for arranging the correction plate inside or near the objective lens 11, and the spherical aberration generated in the optical path from the specimen A to the objective lens 11 can be corrected by the aspherical correction plate 15 arranged at a predetermined position between the relay lens 12 and the imaging lens 13, so that the degree of freedom in design of the detection optical system 1 is increased.

Further, the aspherical correction plate 15 in the detection optical system 1 of the first embodiment is formed in a shape in which the refractive power at the center portion located on the optical axis of the optical path is formed to be substantially no power, and the negative refractive power gradually increases from the center portion toward the outer peripheral portion. Thus, the spherical aberration generated in the optical path from the specimen A to the objective lens 11 can be effectively corrected.

Further, in the aspherical correction plate 15 in the detection optical system 1 of the first embodiment, the flat surface 15a is formed on one surface in the optical axis direction of the optical path, and the aspherical surface 15b is formed on the other surface. This makes it possible to easily process the spherical aberration into a desired shape for correction, and to easily form the aspherical correction plate 15.

Further, in the detection optical system 1 of the first embodiment, when the wavefront aberration amount generated in an optical path between the specimen A and the incident surface 11a of the objective lens 11 on which the light from the specimen A is incident is denoted by SA, and the focal length of the objective lens 11 is denoted by Fo, $$5\times10^{-8}<(SA/Fo)<1\times10^{-6} \qquad \text{Expression 1}$$

is satisfied. In other words, the aspherical correction plate 15 is formed so as to appropriately correct the spherical aberration that is larger than the spherical aberration amount in the optical microscope and is about the maximum spherical aberration amount generated in the particle inspection device such as the flow cytometer or the imaging cytometer. Thus, the detection optical system 1 can effectively correct the spherical aberration particularly generated in the flow path chip 3.

Further, the numerical aperture NA of the objective lens 11 in the detection optical system 1 of the first embodiment is one or more. Thus, by using a commercially available objective lens having a large numerical aperture NA, the manufacturing cost of the detection optical system 1 can be suppressed, and the detection accuracy of light from the specimen A can be enhanced by the aspherical correction plate 15. That is, the detection accuracy of the light from the specimen A can be enhanced without forming a dedicated objective lens having a large numerical aperture NA. In addition, since the detection optical system 1 includes the objective lens 11 having a numerical aperture NA of one or more, in particular, detection accuracy of scattered light and fluorescence can be enhanced.

Hereinafter, a second embodiment will be described with reference to the drawings. In the second embodiment, the same components as those in the first embodiment are denoted by the same reference numerals as those in the first embodiment, and description thereof will be omitted.

Second Embodiment

Figure 2:
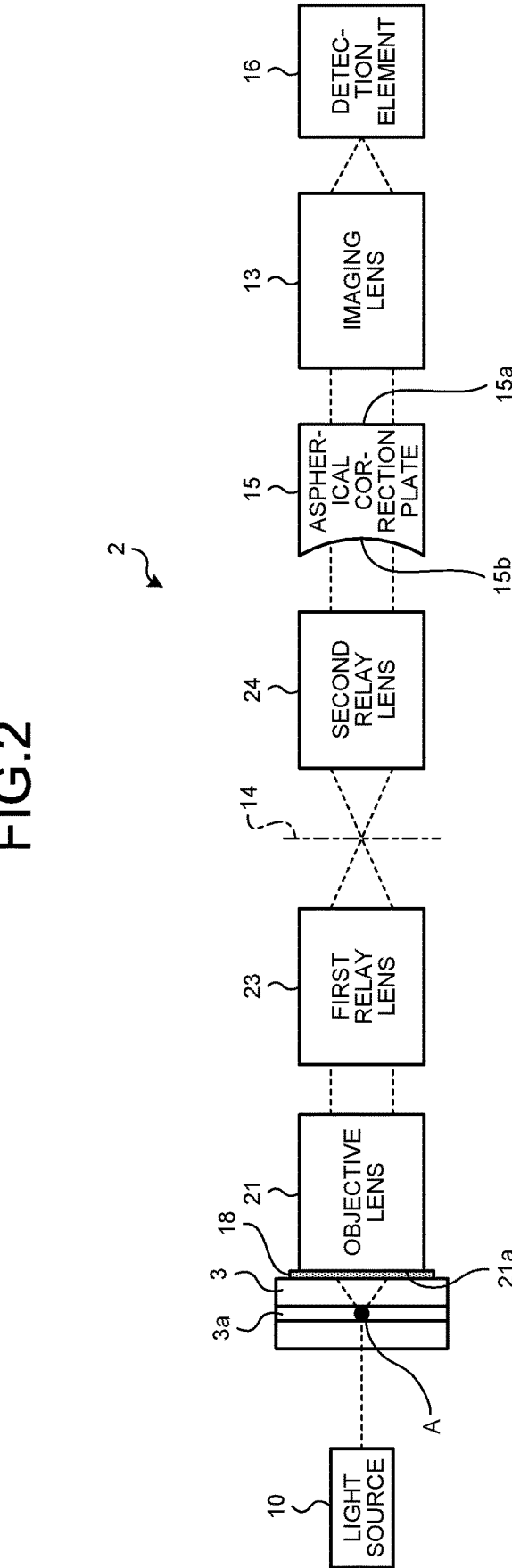
FIG. 2 is a schematic diagram illustrating a detection optical system of a second embodiment.

The second embodiment is different from the first embodiment in which the objective lens 11 is finite conjugate in that the objective lens 11 is a detection optical system in a case of infinite conjugate. FIG. 2 is a schematic diagram illustrating a detection optical system of the second embodiment.

(Configuration of Detection Optical System)

As illustrated in FIG. 2, the detection optical system 2 of the second embodiment includes an objective lens 21, a first relay lens 23, a second relay lens 24, and the imaging lens 13, which are arranged in order from the specimen A side along the optical path of the light from the specimen A illuminated by the light source 10, and light from the imaging lens 13 is detected by the detection element 16.

The objective lens 21 in the second embodiment emits light from the specimen A as parallel light. Similarly to the objective lens 11 in the first embodiment, for example, a commercially available objective lens is also used as the objective lens 21, and an objective lens having a numerical aperture NA of one or more is particularly preferable from the viewpoint of enhancing the sensitivity for detecting scattered light and fluorescence from the specimen A.

The primary imaging plane 14 is provided on the optical path between the first relay lens 23 and the second relay lens 24. The aspherical correction plate 15 that corrects the spherical aberration is arranged at a position located between the second relay lens 24 and the imaging lens 13 and substantially conjugate with the pupil position of the objective lens 21.

A condenser lens is used as the first relay lens 23, and forms an image of light incident from the objective lens 21 on the primary imaging plane 14. A collimator lens is used as the second relay lens 24, and collimates light incident from the first relay lens 23 through the primary imaging plane 14.

Further, in the detection optical system 2, a plurality of relay lenses constituting the optical path may be arranged on an optical path between the objective lens 21 and the first relay lens 23, an optical path between the second relay lens 24 and the aspherical correction plate 15, and an optical path between the aspherical correction plate 15 and the imaging lens 13 as necessary. In addition, the objective lens 21 may be formed by combining a plurality of lenses.

Further, also in the detection optical system 2 of the second embodiment, as in the first embodiment described above, when the wavefront aberration amount generated in the optical path between the specimen A and the incident surface 21a of the objective lens 21 on which the light from the specimen A is incident is denoted by SA, and the focal length of the objective lens 21 is denoted by Fo, $$5\times10^{-8}<(SA/Fo)<1\times10^{-6} \qquad \text{Expression 1}$$

is satisfied.

(Behavior of Light)

In the detection optical system 2, the light from the specimen A is incident on the objective lens 21, and the light emitted from the objective lens 21 is incident on the first relay lens 23. The light incident on the first relay lens 23 forms an image on the primary imaging plane 14 located between the first relay lens 23 and the second relay lens 24, and is incident on the second relay lens 24. The light incident on the second relay lens 24 is incident on the aspherical correction plate 15, and the light in which the spherical aberration is corrected is incident on the imaging lens 13. The light incident on the imaging lens 13 is condensed on the light receiving region of the detection element 16, and the light from the specimen A is detected by the detection element 16.

(Effects)

As described above, the detection optical system 2 of the second embodiment includes the objective lens 21, the first relay lens 23, the second relay lens 24, and the imaging lens 13, the primary imaging plane 14 is provided on the optical path between the first relay lens 23 and the second relay lens 24, and the aspherical correction plate 15 that corrects the spherical aberration is arranged at a position located between the second relay lens 24 and the imaging lens 13 and substantially conjugate with the pupil position of the objective lens 21. Thus, also in the detection optical system 2 of the second embodiment, as in the first embodiment, the spherical aberration generated in the optical path from the specimen A to the objective lens 21 can be corrected by the aspherical correction plate 15.

(Configuration of Inspection Device)

The detection device including any one of the detection optical systems 1 and 2 of the first and second embodiments configured as described above may be applied to a particle detection device such as a flow cytometer or an imaging cytometer. Note that the "particles" as the specimen A in the flow cytometer and the imaging cytometer widely include biologically relevant particles such as cells, microorganisms, and liposomes, or synthetic particles such as latex particles, gel particles, and industrial particles, and the like.

Figure 3:
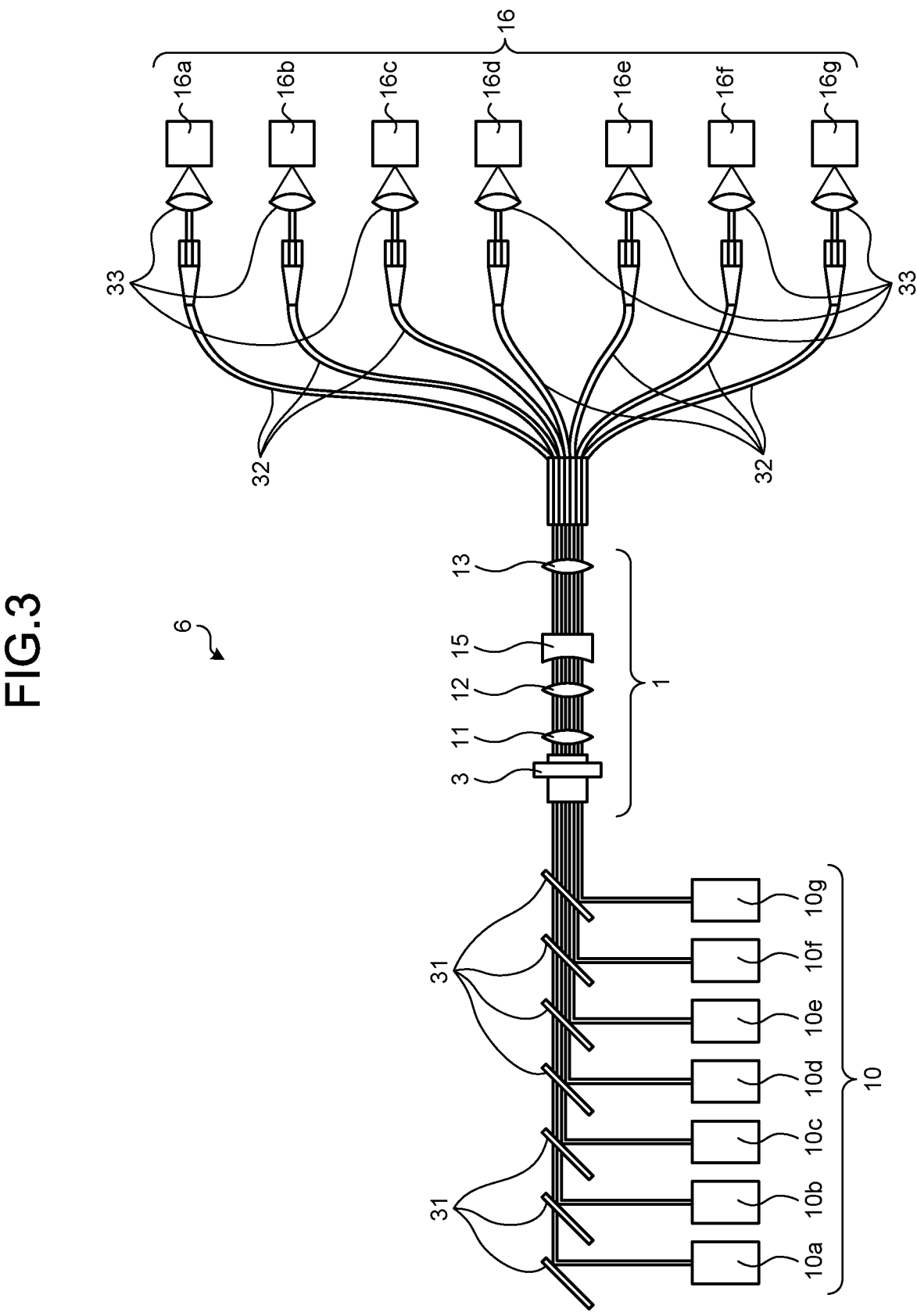
FIG. 3 is a schematic diagram illustrating a flow cytometer as an inspection device including the detection optical system of the first embodiment.

FIG. 3 is a schematic diagram illustrating a flow cytometer as an inspection device including the detection optical system 1 of the first embodiment. As illustrated in FIG. 3, the flow cytometer 6 of the example includes the detection optical system 1 of the first embodiment, a plurality of light sources 10 (10a to 10g) that emits a plurality of types of laser beams having different wavelengths, and a plurality of detection elements 16 (16a to 16g) that detects a plurality of types of respective beams from the plurality of light sources 10 (10a to 10g). In addition, the flow cytometer 6 includes a plurality of prism mirrors 31 arranged on an optical path of light from each of the light sources 10 (10a to 10g), a plurality of optical fibers 32 to which light from the imaging lens 13 of the detection optical system 1 is incident, and a plurality of condenser lenses 33 that condenses light from the respective optical fibers 32 to the respective detection elements 16 (16a to 16g).

The plurality of light sources 10 (10a to 10g) emits laser beams having respective wavelengths (excitation wavelengths) of 320 [nm], 355 [nm], 405 [nm], 488 [nm], 561 [nm], 637 [nm], and 808 [nm], for example. Each of the detection elements 16 (16a to 16g) has a detection wavelength range on a longer wavelength side than each wavelength of each light source 10. Corresponding to the light sources 10a and 10b that emit respective laser beams having wavelengths of 320 [nm] and 355 [nm], the detection elements 16a and 16b that detect scattered light and fluorescence from the particles excited by the laser beams are provided so as to be capable of detecting a wavelength of about 360.5 [nm] to 843.8 [nm]. Corresponding to the light source 10c that emits a laser beam having a wavelength of 405 [nm], the detection element 16c that detects scattered light and fluorescence from the particles excited by the laser beam is provided so as to be capable of detecting a wavelength of about 413.6 [nm] to 843.8 [nm]. Corresponding to the light source 10d that emits a laser beam having a wavelength of 488 [nm], the detection element 16d that detects scattered light and fluorescence from the particles excited by the laser beam is provided so as to be capable of detecting a wavelength of about 492.9 [nm] to 843.4 [nm]. Corresponding to the light source 10e that emits a laser beam having a wavelength of 561 [nm], the detection element 16e that detects scattered light and fluorescence from the particles excited by the laser beam is provided so as to be capable of detecting a wavelength of about 555.3 [nm] to 843.8 [nm]. Corresponding to the light source 10f that emits a laser beam having a wavelength of 638 [nm], the detection element 16f that detects scattered light and fluorescence from the particles excited by the laser beam is provided so as to be capable of detecting a wavelength of about 643.3 [nm] to 843.8 [nm]. Corresponding to the light source 10g that emits a laser beam having a wavelength of 808 [nm], the detection element 16g that detects scattered light and fluorescence from the particles excited by the laser beam is provided so as to be capable of detecting a wavelength of about 823.5 [nm] to 920.0 [nm].

Further, the detection elements 16 (16a to 16g) are densely arranged such that the light receiving regions are adjacent to each other, and the flow cytometer 6 is downsized. In addition, in the flow cytometer 6, the aspherical correction plate 15 of the detection optical system 1 is arranged at a position where optical axes of respective beams having different wavelengths from the respective light sources 10 overlap each other in the optical path. Furthermore, as the flow cytometer 6, instead of using the plurality of detection elements 16, a single detection element in which respective light receiving regions that receive light from the light sources 10 (10a to 10g) are arranged adjacent to each other may be used.

In the flow cytometer 6 using the flow path chip 3 and the imaging cytometer 7 to be described later, when the spherical aberration generated in the optical path between the particles and the objective lens 11 is corrected using the correction plate, it is often difficult to secure a space for disposing the correction plate in the vicinity of the flow path chip 3, for example, inside the objective lens. Even in such a case, by arranging the aspherical correction plate 15 at a predetermined position in the optical path between the objective lens 11 and the imaging lens 13, it is possible to correct the spherical aberration generated in the optical path from the specimen A to the objective lens 11, and the degree of freedom in design of the detection optical system 1 is increased.

Further, in a case where the scattered light and fluorescence from the particles in the flow path chip 3 are detected as described above, large spherical aberration occurs in the optical path from the particles to the objective lens 11 due to the optical influence of the material forming the flow path chip 3. Therefore, by using the aspherical correction plate 15 arranged at a predetermined position as described above, the spherical aberration generated in the optical path from the particles to the objective lens 11 can be effectively corrected, and the detection accuracy of the scattered light and fluorescence from the particle can be enhanced.

In particular, in a case where the plurality of detection elements 16 is arranged densely adjacent to each other, there is a possibility that erroneous detection of light between the detection elements 16 adjacent to each other, that is, what is called crosstalk occurs. Even in a case where such crosstalk becomes a problem, since the spherical aberration can be appropriately corrected by the aspherical correction plate 15, the occurrence of the crosstalk can be suppressed. In addition, in order to avoid the crosstalk, excitation spot positions are arranged to be separated from each other by the laser beam, or the plurality of detection elements 16 is arranged to be separated from each other, so that it is possible to prevent an increase in size of the entire flow cytometer 6.

Therefore, when applied to the flow cytometer 6 including the detection optical systems 1 and 2 of the first and second embodiments and the imaging cytometer 7 to be described later, it is possible to suppress the manufacturing cost by using a commercially available objective lens having a large numerical aperture NA and to enhance the detection accuracy of the scattered light and fluorescence by the aspherical correction plate 15.

Figure 4:
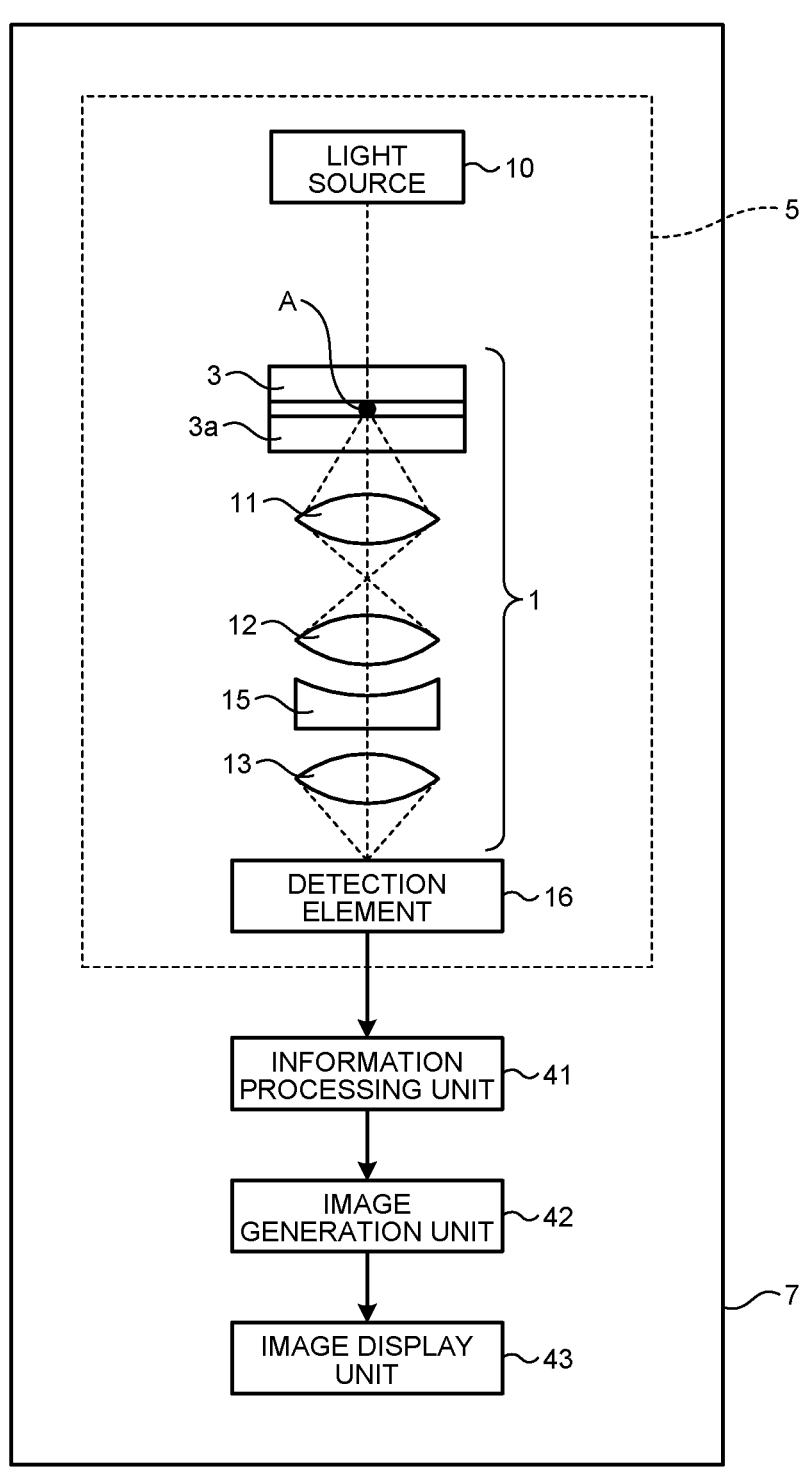
FIG. 4 is a schematic diagram illustrating an imaging cytometer as an inspection device including the detection optical system of the first embodiment.

FIG. 4 is a schematic diagram illustrating the imaging cytometer as the inspection device including the detection optical system of the first embodiment. As illustrated in FIG. 4, the imaging cytometer 7 of the embodiment includes a detection module 5 including the detection optical system 1 of the first embodiment, the light source 10 that irradiates the specimen A with light, and the detection element 16 that detects light from the specimen A. That is, the imaging cytometer 7 includes the detection module 5 as the detection device of the present disclosure. Furthermore, the imaging cytometer 7 includes an information processing unit 41 that performs information processing on the basis of a detection signal that is a detection result of the detection element 16, an image generation unit 42 that generates an image on the basis of the detection result of the detection element 16, that is, on the basis of an output signal from the information processing unit 41, and an image display unit 43 that displays an image on the basis of an output signal from the image generation unit 42.

As the light source 10, for example, a laser light source is used. As the information processing unit 41 and the image generation unit 42, for example, a central processing unit, various storage devices, and the like are used. For example, a liquid crystal display plate or the like is used as the image display unit 43.

Furthermore, the imaging cytometer 8 may be configured to, for example, divide light from the specimen A into a plurality of beams for each wavelength with a spectroscopic element (not illustrated) such as a grating or a prism, and detect respective beams having different wavelengths by the plurality of detection elements 16. In this case, the imaging cytometer includes the plurality of detection elements 16 that detects beams of respective wavelengths, as does the flow cytometer 6 described above. In a case of using the spectroscopic element, a plurality of condenser lenses (not illustrated) that condenses each split beam on each detection element 16 may be provided. In addition, instead of using the spectroscopic element, the imaging cytometer 7 may also include the plurality of light sources 10 that irradiates the specimen A with a plurality of types of beams having different wavelengths, as does the flow cytometer 6 described above.

The flow cytometer 6 illustrated in FIG. 3 and the imaging cytometer 7 illustrated in FIG. 4 include the detection optical system 1 of the first embodiment, but may include the detection optical system 2 of the second embodiment.

Note that the present technology can also employ the following configurations.

(1)
A detection optical system, comprising:
an objective lens, a first relay lens, a second relay lens, and an imaging lens, which are arranged in order from a side of a specimen along an optical path of light from the specimen illuminated by a light source,
wherein a primary imaging plane is provided on the optical path between the first relay lens and the second relay lens, and
an aspherical correction plate that corrects spherical aberration is arranged at a position located between the second relay lens and the imaging lens and substantially conjugate with a pupil position of the objective lens.

(2)
A detection optical system, comprising:
an objective lens, a relay lens, and an imaging lens, which are arranged in order from a side of a specimen along an optical path of light from the specimen illuminated by a light source,
wherein a primary imaging plane is provided on the optical path between the objective lens and the relay lens, and
an aspherical correction plate that corrects spherical aberration is arranged at a position located between the relay lens and the imaging lens and substantially conjugate with a pupil position of the objective lens.

(3)
The detection optical system according to (1) or (2), wherein
the aspherical correction plate is formed in a shape in which refractive power at a center portion located on an optical axis of the optical path is formed to be substantially no power, and negative refractive power gradually increases from the center portion toward an outer peripheral portion.

(4)
The detection optical system according to any one of (1) to (3), wherein
in the aspherical correction plate, a flat surface is formed on one surface in an optical axis direction of the optical path, and an aspherical surface is formed on the other surface.

(5)
The detection optical system according to any one of (1) to (4), wherein
when a wavefront aberration amount generated in the optical path between the specimen and an incident surface of the objective lens on which light from the specimen is incident is denoted by SA, and a focal length of the objective lens is denoted by Fo, $$5 \times 10^{-8} < (\text{SA/Fo}) < 1 \times 10^{-6}$$

is satisfied.

(6)
The detection optical system according to any one of (1) to (5), wherein
a numerical aperture NA of the objective lens is one or more.

(7)
A detection device, comprising:
the detection optical system according to any one of (1) to (6);
a light source that irradiates the specimen with light; and
a detection element that detects light from the specimen.

(8)
A detection device, comprising:
the detection optical system according to any one of (1) to (6);
a plurality of light sources that irradiates the specimen with a plurality of types of beams; and a plurality of detection elements that detect each beam from the specimen corresponding to the plurality of types of beams.

(9)

A flow cytometer, comprising:

the detection device according to (8); and the plurality of light sources that irradiates a flow path chip having a flow path through which particles as the specimen flow with a plurality of types of beams having different wavelengths.

(10)

An imaging cytometer, comprising:

the detection device according to (7);

the light source that irradiates a flow path chip having a flow path through which particles as the specimen flow with light; and an image generation unit that generates an image on a basis of a detection result of the detection element.

REFERENCE SIGNS LIST 1, 2 DETECTION OPTICAL SYSTEM
3 FLOW PATH CHIP
3a FLOW PATH
5 DETECTION MODULE (DETECTION DEVICE)
6 FLOW CYTOMETER
7 IMAGING CYTOMETER
10 LIGHT SOURCE
11 OBJECTIVE LENS
11a INCIDENT SURFACE
12 RELAY LENS
13 IMAGING LENS
14 PRIMARY IMAGING PLANE
15 ASPHERICAL CORRECTION PLATE
15a FLAT SURFACE
15b ASPHERICAL SURFACE
16 DETECTION ELEMENT
21 OBJECTIVE LENS
21a INCIDENT SURFACE
23 FIRST RELAY LENS
24 SECOND RELAY LENS
42 IMAGE GENERATION UNIT
A SPECIMEN

The invention claimed is:

1. A detection optical system, comprising:

a plurality of light sources configured to illuminate a specimen, wherein each of the plurality of light sources has a respective excitation spot corresponding to the specimen, the plurality of light sources is configured to irradiate the specimen with a plurality of types of beams, the plurality of types of beams is associated with a plurality of wavelengths, each of the plurality of types of beams is associated with a respective optical axis of a plurality of optical axes, and a position of the respective excitation spot of each of the plurality of light sources is different;

an objective lens;

a first relay lens;

a second relay lens;

an imaging lens;

a plurality of optical fibers, wherein the objective lens, the first relay lens, the second relay lens, and the imaging lens are in this order from a side of the specimen, the objective lens, the first relay lens, the second relay lens, and the imaging lens are on an optical path of light from the illuminated specimen, a primary imaging plane is on the optical path, and the primary imaging plane is between the first relay lens and the second relay lens; and an aspherical correction plate configured to correct spherical aberration, wherein the imaging lens is configured to condense light from the aspherical correction plate to each of the plurality of optical fibers, the aspherical correction plate is at a position substantially conjugate with a pupil position of the objective lens, a first optical axis of the plurality of optical axes overlaps a second optical axis of the plurality of optical axes at the position of the aspherical correction plate, the second optical axis is different from the first optical axis, the aspherical correction plate is between the second relay lens and the imaging lens, and the aspherical correction plate includes:

a flat surface in a direction of the optical path of the plurality of optical axes; and a concave aspherical surface opposite to the flat surface.

2. The detection optical system according to claim 1, wherein the aspherical correction plate further includes:

a center portion on an optical axis of the optical path; and an outer peripheral portion, the aspherical correction plate has substantially no refractive power at the center portion, and the aspherical correction plate has a negative refractive power that gradually increases from the center portion toward the outer peripheral portion.

3. The detection optical system according to claim 1, wherein $$5\times10^{-8}<(SA/Fo)<1\times10^{-6},$$

SA is a wavefront aberration amount generated in the optical path between the illuminated specimen and an incident surface of the objective lens on which the light from the illuminated specimen is incident, and Fo is a focal length of the objective lens.

4. The detection optical system according to claim 1, wherein a numerical aperture (NA) of the objective lens is one or more.

5. A detection device, comprising:

the detection optical system according to claim 1; and a detection element configured to detect the light from the illuminated specimen.

6. An imaging cytometer, comprising:

the detection device according to claim 5;

a flow cell having a flow path through which particles as the specimen flows, wherein the plurality of light sources is further configured to irradiate the flow cell with specific light; and an image generation unit configured to generate an image based on a result of the detection by the detection element.

7. A detection device, comprising:

the detection optical system according to claim 1; and a plurality of detection elements configured to detect each beam from the specimen corresponding to the plurality of types of beams.

8. A flow cytometer, comprising:

the detection device according to claim 7; and a flow cell having a flow path through which particles as the specimen flows.

9. The flow cytometer according to claim 8, wherein the plurality of optical fibers is configured to condense light from the imaging lens to the plurality of detection elements, and the flow cytometer further comprises a plurality of condenser lenses configured to condense light from each of the plurality of optical fibers to each of the plurality of detection elements.

10. A detection optical system, comprising:

a plurality of light sources configured to illuminate a specimen, wherein each of the plurality of light sources has a respective excitation spot corresponding to the specimen, the plurality of light sources is configured to irradiate the specimen with a plurality of types of beams, the plurality of types of beams is associated with a plurality of wavelengths, each of the plurality of types of beams is associated with a respective axis of a plurality of optical axes, and a position of the respective excitation spot of each of the plurality of light sources is different;

an objective lens;

a relay lens;

an imaging lens;

a plurality of optical fibers, wherein the objective lens, the relay lens, and the imaging lens are in this order from a side of the specimen, the objective lens, the relay lens, and the imaging lens are on an optical path of light from the illuminated specimen, a primary imaging plane is on the optical path, and the primary imaging plane is between the objective lens and the relay lens; and an aspherical correction plate configured to correct spherical aberration, wherein the imaging lens is configured to condense light from the aspherical correction plate to each of the plurality of optical fibers, the aspherical correction plate is at a position substantially conjugate with a pupil position of the objective lens, a first optical axis of the plurality of optical axes overlaps a second optical axis of the plurality of optical axes at the position of the aspherical correction plate, the second optical axis is different from the first optical axis, the aspherical correction plate is between the relay lens and the imaging lens, and the aspherical correction plate includes:

a flat surface in a direction of the optical path of the plurality of optical axes; and a concave aspherical surface opposite to the flat surface.

11. The detection optical system according to claim 10, wherein the aspherical correction plate further includes:

a center portion on an optical axis of the optical path; and an outer peripheral portion, the aspherical correction plate has substantially no refractive power at the center portion, and the aspherical correction plate has a negative refractive power that gradually increases from the center portion toward the outer peripheral portion.

12. The detection optical system according to claim 10, wherein $$5\times10^{-8}<(SA/Fo)<1\times10^{-6},$$

SA is a wavefront aberration amount generated in the optical path between the illuminated specimen and an incident surface of the objective lens on which the light from the illuminated specimen is incident, and Fo is a focal length of the objective lens.

13. The detection optical system according to claim 10, wherein a numerical aperture (NA) of the objective lens is one or more.

14. A detection device, comprising:

the detection optical system according to claim 10; and a detection element configured to detect the light from the illuminated specimen.

\* \* \* \* \*